Patented Mar. 8, 1949

2,464,060

UNITED STATES PATENT OFFICE 2,464,060

METHOD OF FORMING ENDLESS BELTS USEFUL AS SOUND RECORDING MEDIA

Richard G. Rowe, New Haven, and George B. Bona, Bridgeport, Conn., assignors to Dictaphone Corporation, New York, N. Y., a corporation of New York No Drawing. Application November 24, 1943, Serial No. 511,598

3 Claims. (Cl. 18—58)

This invention relates to the art of making plastic films and more particularly to a novel method of forming endless plastic belts by deposition of a solution of a cellulosic material on a molding surface.

As a part of the considerable increase in the development and use of synthetic plastics which has taken place in recent years there has been an increasing demand for relatively thin plastic films for a wide variety of purposes. Such films may be made in a number of ways, but one convenient way of making films of this character is by depositing a coating of a lacquer or other organic solvent solution of a cellulosic material on the surface of a mold, evaporating the solvent to produce a layer or film of the plastic material, and then stripping the film from the molding surface. One serious problem that has been encountered in making plastic films in this way arises out of the tendency of the film to adhere to the molding surface on which it is formed. Because of this adherence it is difficult to remove the film from the molding surface without breaking or distorting the film or producing mechanical flaws in the molded surface of the film. This problem is particularly acute in cases where the molded surface of the film is to be used, for example, for sound recording and reproduction purposes. In such cases it is of primary importance that the molded surface of the film be uniformly smooth and free from mechanical imperfections and also that it be in its original unstretched condition.

It is an object of the present invention to provide a method of making a plastic film having a molded surface which is uniformly smooth and substantially free from mechanical imperfections.

It is another object of the invention to provide a method of making a plastic film on a molding surface of such a character that the film after it is formed can be easily removed from the molding surface without stretching or otherwise distorting the film.

Other objects of the invention will be in part obvious and in part pointed out hereinafter.

As pointed out above, the method of the present invention is particularly well adapted for the production of plastic films having a molded surface to be used for sound recording and reproducing purposes, although as the description proceeds it will be apparent that the method may be used for producing plastic films for other purposes as well. The objects of the invention may be achieved in general by applying to the molding surface prior to the deposition of the film-forming material thereon, a parting agent which will facilitate subsequent removal of the plastic film from the molded surface. We have found that particularly good results may be obtained by initially applying to the molding surface a layer of a relatively low melting point amorphous "organophobic wax." The term "organophobic wax" as used in the specification and claims is intended to describe a wax which is substantially insoluble in organic solvents of the type commonly used for dissolving cellulosic materials to form solutions from which plastic films can be made.

It has been found that there are a number of advantages which result from the use of such an organophobic wax. Since the wax is insoluble in the solvents used to dissolve the film-forming material there is no danger that the wax will contaminate the lacquer solution and thereby alter the composition of the resulting plastic film. Furthermore since the wax is not attacked by the lacquer solvents it can be applied to the molding surface as an exceedingly thin film and still retain its effectiveness as a parting agent. It has been found that waxes of the type disclosed in the specific example given below may be effectively used in film thicknesses of the order of 0.0005 inch.

The wax used is preferably amorphous rather than crystalline since such waxes give a smoother surface which is better adapted for sound recording purposes. The wax may be applied to the surface of the mold in any suitable manner which will produce the desired thin smooth film. In cases where the wax is water soluble it is advantageous to apply the wax in the form of a water solution because of the fact that a very thin layer of uniform thickness may be easily formed in this way.

The following specific example is given to illustrate a preferred manner of carrying out the method of the present invention. The purpose of the procedure described below is to make a plastic film in the form of a sleeve or cylinder having an outer surface which may be satisfactorily used for sound recording and reproducing purposes.

A solution was prepared according to the following formula:

| Component | Parts by Weight |
|---|---|
| Distilled Water | 8,000 |
| "Carbowax" 4,000 | 100 |
| 10% Aqueous "Aerosol O. T." | 10 |

"Carbowax" 4000 is the trade name of an amorphous polymerized glycol manufactured by the Carbide and Carbon Chemicals Corporation. "Aerosol O. T." is the trade name of a wetting agent manufactured by the American Cyanamid and Chemical Corporation and is chemically a di-octyl sodium sulfosuccinate. "Carbowax" is soluble in water and substantially insoluble in organic solvents of the type commonly used for dissolving cellulosic materials.

In preparing the wax solution the water was heated to about 120° F. and the flaked "Carbowax" dissolved therein with agitation, after which the "Aerosol O. T." wetting agent was added.

A glass cylinder was used as a mold, the inner surface of the cylinder being the molding surface. The wax solution prepared as described above was run down over the inner surface of the glass cylinder until the surface was completely wetted, and then the wetted surface was air dried for from ten to thirty minutes to vaporize the volatile constituents of the solution and form a thin layer or film of a water-soluble lacquer-insoluble wax spread evenly over the molding surface.

After formation of this thin film of wax a lacquer solution having approximately the following composition was applied to the molding surface:

| | Percent by weight |
|---|---|
| Ethyl cellulose | 12 |
| Butanol | 18 |
| Xylene | 70 |

The lacquer solution was applied by arranging the cylindrical mold with its axis vertical and forcing the lacquer solution up through the glass cylinder until the liquid level reached the top of the cylinder, then causing the liquid level to drop at a relatively slow controlled rate and allowing the molding surface to drain. After the liquid level of the lacquer solution dropped below the bottom of the mold, the molding surface was permitted to drain for an additional period of about twenty-five minutes and was then air-dried for about thirty minutes.

After drying, a second coat of lacquer was applied. The cylindrical mold was inverted and the second lacquer coating applied in the same manner as the first coating. The reason for inverting the cylindrical mold is that as the liquid level drops within the mold the top portion of the molding surface has a longer period to drain than the lower part and hence there is a tendency for the plastic film to be thinner near the top of the molding surface. By inverting the cylindrical mold before the second coat of lacquer is applied a more nearly uniform film can be obtained.

When the second coat had been applied, the cylinder was again drained for twenty-five minutes and air-dried for about one hour, after which it was seasoned for two hours, i. e. it was exposed to a stream of air at a temperature of about 130° F.

The mold and associated film were cooled to room temperature and the film stripped from the mold. It was found that the film could be easily stripped from the mold by merely pulling it free and that the molded surface of the film was unusually smooth and free from mechanical imperfections. As the film is removed from the mold its outer surface has a layer of wax thereon but since the wax used is water-soluble, it may be easily removed by simply washing the surface of the film with water.

In some cases the step of removing the wax layer from the molded surface of the film may be omitted. It has been found that where the film is to be used for sound-recording purposes the wax layer has no detrimental effect on the sound recording characteristics of the film surface and there is some evidence that it actually improves the recording characteristics of the film surface.

As an alternative procedure for removing the film from the molding surface, the mold, after it has been cooled, may be immersed in warm water at a temperature either below or above the melting point of the wax used. Since the "Carbowax" has a relatively low melting point and is soluble in water the film may be easily separated from the molding surface in this manner.

It has been found that a molded plastic surface prepared in accordance with the procedure described above has a remarkably smooth surface which is unusually free from mechanical flaws. The layer of wax initially applied to the molding surface apparently fills up tiny imperfections that may exist in the molding surface. If no wax were used these small imperfections would produce corresponding imperfections in the surface of the film. By using the wax a much more nearly uniform plastic surface is obtained. The amorphous character of the wax is likewise of assistance in producing a smooth surface.

It is of course to be understood that the method and parting agent of the present invention are not limited to the specific features described above. Any of various known lacquer solutions adapted to be used in the formation of a plastic film may be utilized and a variety of known procedures for applying the lacquer to the molding surface may be used. The mold need not be made of glass, but may be made of molded plastic, metal, cast resin or other suitable material. Since the layer of wax is organophobic it will act to protect a plastic or resin molding surface against the action of the lacquer solvent. Other types of organophobic waxes such as "Carbowax 1500" may be used and other well known wetting agents may be substituted for the "Aerosol O. T." specifically disclosed.

From the above description it is apparent that the present invention provides a method for making an improved plastic film having an unusually smooth surface which is remarkably free from mechanical imperfections and flaws. Since the parting agent is organophobic it does not dissolve in the lacquer solvent and hence does not affect the composition of the resulting film.

Since many embodiments might be made of the above invention and since many changes might be made in the specific embodiment described above, it is to be understood that all matter hereinbefore disclosed is to be interpreted as illustrative only and not in a limiting sense.

We claim:

1. The method of making an improved sound recording medium which comprises forming on the inner surface of a cylindrical mold a thin layer of a highly polymerized glycol wax, filling said cylindrical mold with a solution of a cellulose compound in a solvent essentially comprising a mixture of an aromatic hydrocarbon and an aliphatic alcohol, causing the liquid level of said solution within said cylindrical mold to drop at a relatively slow controlled rate to leave a layer of said solution on the wall of said mold, vaporizing said solvent to form an endless belt of plastic on said molding surface, inverting said mold and applying a second layer of plastic to the inner surface thereof, and removing said endless belt from said molding surface to cause a thin layer of said wax to adhere to the outer surface of said belt, whereby the sound recording characteristics of said belt are improved.

2. The method of making an improved sound recording medium which comprises forming on the inner surface of a cylindrical mold a thin layer of a stripping agent, filling said cylindrical mold with a solution of a cellulose compound in a solvent essentially comprising a mixture of an aromatic hydrocarbon and an aliphatic alcohol, causing the liquid level of said solution within said cylindrical mold to drop at a relatively slow controlled rate to leave a layer of said solution on the wall of said mold, vaporizing said solvent to form an endless belt of plastic on said molding surface, inverting said mold and applying a second layer of plastic to the inner surface thereof, and removing the resulting endless belt from said molding surface.

3. The method of making an improved sound recording medium which comprises forming on the surface of a cylindrical mold a thin layer of a stripping agent, arranging said mold with its axis vertical, applying to said surface of said mold a body of a solution of a cellulose compound in a solvent essentially comprising a mixture of an aromatic hydrocarbon and an aliphatic alcohol, draining said solution from said mold to cause a thin layer of solution to be retained on the surface thereof, vaporizing said solvent to form an endless belt of plastic on said molding surface, inverting said mold and applying a second layer of plastic thereto and removing the resulting endless belt from said molding surface.

RICHARD G. ROWE.
GEORGE B. BONA.

REFERENCES CITED

The following references are of record in the file of this patent:

UNITED STATES PATENTS

| Number | Name | Date |
|---|---|---|
| Re. 20,080 | Robertson | Aug. 25, 1936 |
| 1,659,399 | Faber | Feb. 14, 1928 |
| 1,876,229 | Herzog et al. | Sept. 6, 1932 |
| 2,019,215 | Dippel | Oct. 29, 1935 |
| 2,085,383 | Neumann | June 29, 1937 |
| 2,198,621 | Izard | Apr. 30, 1940 |
| 2,296,723 | McClurg et al. | Sept. 22, 1942 |
| 2,320,431 | Hawtin et al. | June 1, 1943 |
| 2,321,732 | Brant | June 15, 1943 |
| 2,339,840 | Daly et al. | Jan. 25, 1944 |

FOREIGN PATENTS

| Number | Country | Date |
|---|---|---|
| 926 | Great Britain | May 18, 1901 |

OTHER REFERENCES

Synthetic Organic Chemicals, Carbide and Carbon Chemicals Corporation, 10th edition, October 15, 1940, pp. 66–68. Copy in Div. 15.